Sept. 25, 1923.
C. F. PAUL, JR
1,468,740
CENTRIFUGAL SEPARATION AND CENTRIFUGAL FILTRATION OF LIQUIDS
Filed Jan. 23, 1922
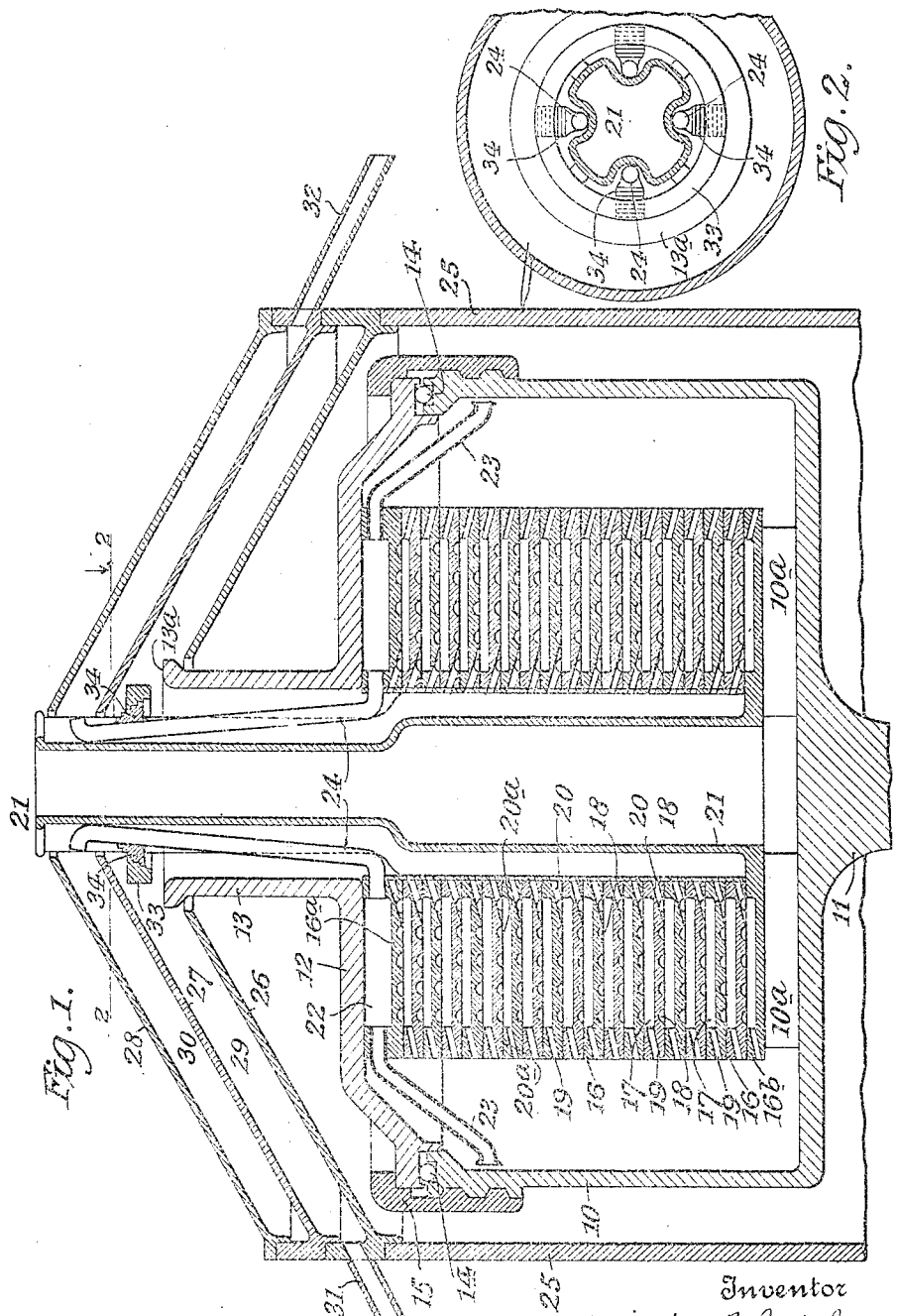

Patented Sept. 25, 1923.

1,468,740

UNITED STATES PATENT OFFICE.

CHRISTIAN F. PAUL, JR., OF AUSTIN, TEXAS.

CENTRIFUGAL SEPARATION AND CENTRIFUGAL FILTRATION OF LIQUIDS.

Application filed January 23, 1922. Serial No. 531,064.

*To all whom it may concern:*

Be it known that I, CHRISTIAN F. PAUL, Jr., a citizen of the United States of America, residing at Austin, in the county of Travis and State of Texas, have invented certain new and useful Improvements in Centrifugal Separation and Centrifugal Filtration of Liquids, of which the following is a full, clear, and exact description.
This invention relates to filters of the centrifugal type, and its chief object is to provide an apparatus of that class which will not only serve as an efficient filter but will at the same time separate two commingled liquids of different specific gravities. To this and other ends the invention consists in the novel features and combinations hereinafter described.

One form of the invention is illustrated in the accompanying drawing, in which—

Fig. 1 shows the apparatus in vertical section;

Fig. 2 is a sectional plan view on line 2—2.

As illustrated, the combined filter and separator comprises a cylindrical vessel 10 mounted on a vertical shaft 11 by which it may be revolved at a suitable speed, the shaft itself being driven by any convenient means, not shown. The vessel is closed by a removable cover 12 provided with an upwardly open neck 13. The cooperating edges of the vessel and cover are grooved to receive a yielding gasket 14 which is compressed or flattened to give a liquid-tight joint by screwing down the clamping ring 15.

Inside of and coaxial with the vessel 10 and neck 13 is a series of superposed centrally apertured disks 16, provided with shallow annular recesses 17 on their upper sides and with spiral, radial and annular, or otherwise suitably shaped, grooves or recesses 18. At their outer edges the disks are each provided with a series of inlet passages 19 terminating in the recesses 17 and at their inner edges the disks are each provided with outlet passages 20 leading from the grooves 18. Between the disks are rings 20ª of filter paper, felt, or other suitable filtering material, covering the grooves 18. The lowermost disk need not have its underside grooved but it is equipped with an upright tube or passage 21 through which the liquid or liquids to be clarified are introduced. It will be understood that the disks 16 and the tube 21 are coaxial with the other revolving parts. The uppermost disk, 16ª, has on its upper side a somewhat deeper recess (designated 22) and is provided at its inner and outer edges with two series of tubes 23, 24, the former being inlet tubes for delivering material to the recess and the latter tubes being outlets for carrying away the material delivered by the others. It will be noted that the outlet tubes extend up through the neck 13 and discharge laterally a slight distance above the same. It will also be noted that the tubes 23 have their intake orifices close to the outer wall of vessel 10. The lowermost disk, 16ᵇ, may have no grooves or recesses on its underside, but rests on a series of radial ribs 10ª on the bottom of the vessel 10 so that when the ring 15 is screwed down the disks will be pressed together, holding the filtering rings firmly but leaving ample space at the bottom of the disk assembly for the centrifugal flow of liquid delivered through the supply tube 21.

The parts described above, constituting the "bowl" of the combined separator and filter, are enclosed in a non-rotating housing 25 having a plurality of rimmed covers 26, 27, 28 removably seated one above the other and providing conical chambers 29, 30 into which the effluents from neck 13 and tubes 24, respectively are discharged, and from which the effluents escape by way of discharge spouts 31, 32.

With the bowl revolving at a suitable speed, liquid delivered into tube 21, at the top, descends therein and under the influence of centrifugal force, passes under the disk assembly to the annular space between the disks and the side walls of vessel 10. Here more or less of the heavier suspended particles are promptly thrown outwardly to the vessel walls. Rising in the aforesaid space or separation chamber the heavier portion seeks the outer wall, and, reaching the inlet orifices of the tubes 23, passes into the same together with heavier particles carried by such portion of the liquid and flows into the annular recess 22. From the latter the liquid and the particles carried by it flow into tubes 24 and rising in the latter are delivered to chamber 30 for discharge through spout 32. At the same time the lighter liquid enters the orifices 19 in the disks 16, flows upwardly through the filtering rings 20ª into the grooves 18 (leaving the suspended particles or colloidal matter behind), and thence out through the ports 20 into the space or annular collecting chamber around the inlet tube 21. Rising through this space into the neck 13, the clarified liquid overflows the latter into chamber 29 and thence escapes through spout 31.

The amount of liquid discharged from the edge 13ᵃ of neck 13 depends upon the rate at which the liquid can pass through the filter, which in turn depends (other conditions being constant) upon the density of the filtering medium employed. If the rate of delivery of liquid to the machine is less than or no greater than the capacity of the filter to pass the liquid, there may be no discharge at all from the tubes 24, which, as pointed out before, extend above the top of neck 13. Moreover, it will be observed that the tubes 24 discharge at a point nearer to the axis of the bowl than does the neck 13. These vertical and radial differences between the discharge points afford the hydrostatic and centrifugal head or pressure required to force the liquid inwardly and upwardly through the filter. On the other hand, if the supply of liquid to the machine is greater than the filtering capacity the excess will escape through tubes 23 and 24, carrying with it more or less of the heavier suspended particles.

The tubes 24 are made of resilient material and tend to spring out radially but are restrained by a conically threaded ring 33 cooperating with correspondingly threaded lugs 34 on the tubes. By screwing the ring up or down the tubes are swung toward or from the axis of rotation, thus varying as desired the difference of centrifugal pressure between their discharge orifices and the upper edge of neck 13, according to the density of the filtering medium, as will be readily understood. Thus the difference in centrifugal head is least when the tubes are vertical and greatest when they are swung inwardly against the tube 21.

It is to be understood that the invention is not limited to the specific construction herein illustrated and described but can be embodied in other forms without departure from its spirit.

I claim—

1. In an apparatus for centrifugal filtration and separation, in combination, a separating chamber arranged with its axis vertical and mounted to rotate thereon; a rotating filtering head inside of the separating chamber and comprising a series of coaxial filtering disks and layers of filtering material interposed between said disks, said filtering head being of less diameter than the separating chamber to provide an annular separating space therein and adapted to receive liquid to be filtered from said space; and means for discharging liquids separately from said annular space and filtering head under suitable difference of pressure.

2. In an apparatus for centrifugal filtration and separation, in combination, a separating chamber mounted to rotate on a vertical axis and having an upwardly extending coaxial neck, a rotatable filtering head arranged in the separating chamber to receive unfiltered liquid therefrom and having a central vertical passage to receive filtered liquid, means for delivering liquid to be filtered through said neck to the separating chamber outside of the filtering head, and means for discharging separately through said neck under suitable difference of pressure liquids from the filtering head passage and separating chamber.

3. In an apparatus for centrifugal filtration and separation, in combination, a rotatable filtering head having a central axial passage, comprising a plurality of coaxial centrally apertured superposed disks having filtering recesses and a plurality of layers of filtering material between the disks, said filtering head having inlet passages leading from its outer surface to the filtering recesses and outlet passages leading from the filtering recesses to the central axial passage; a rotatable separating chamber coaxial with and enclosing the filtering head; means for delivering liquid to be filtered through the axial passage in the filtering head to the separating chamber, and means for discharging separately, through paths adjacent to the axis and under suitable differences of pressure, liquid from the separating chamber and liquid from the filtering head passage.

4. In an apparatus for centrifugal filtration and separation, in combination, a hollow filtering head adapted for radially inward flow of liquid to be filtered, a separating chamber enclosing the filtering head and coaxial therewith, means for receiving filtered liquid from the interior of the head and discharging the same outside, means for taking heavier liquid from said separating chamber and discharging it outside under less pressure than that under which liquid from the filtering head is discharged, and means for rotating the head and the chamber.

5. In an apparatus for centrifugal filtration and separation, in combination, a hollow filtering head through which the liquid to be filtered flows inwardly to the interior of the head, means for discharging liquid from the interior of the head at a point above the head, a separating chamber enclosing the head and coaxial therewith, means for conveying liquid from the separating chamber in a radially inward direction and discharging the liquid at a point above the point of discharge of the filtered liquid, and means for rotating the said head and chamber.

6. In an apparatus for centrifugal filtration and separation, in combination, a hollow filtering head having filtering passages adapted to receive liquid from the outside of the head and deliver it into the interior of the head, means for receiving filtered liquid from the interior of the head and discharging it at a point above the head, a separating chamber surrounding the head and coaxial therewith, means for conveying unfiltered liquid from the separating chamber and discharging it under a centrifugal head of predetermined value relative to the centrifugal head on the filtered liquid, and means for varying the centrifugal head on the unfiltered liquid.

7. In a centrifugal separator, means for discharging, at two separated points with a difference of centrifugal head, liquid delivered to the separator, and means for shifting at least one of said separated discharge points toward and from the axis of the separator to vary the difference of centrifugal head.

8. In a centrifugal separator, means for discharging liquid at a point fixed with reference to the axis of the separator, a plurality of flexible tubes for discharging liquid separately from the first liquid, and means for bending said tubes toward and from the axis of the separator to vary the centrifugal head on the liquid discharged by the tubes.

In testimony whereof I hereto affix my signature.

CHRISTIAN F. PAUL, JR.